(12) United States Patent
van Klooster et al.

(10) Patent No.: US 6,923,073 B2
(45) Date of Patent: Aug. 2, 2005

(54) ULTRASONIC FLOW-MEASURING METHOD

(75) Inventors: Jeroen Martin van Klooster, Tiel (NL); Arie Huijzer, Sliedrecht (NL)

(73) Assignee: Krohne, A.G., Basel (CH)

(*) Notice: Subject to any disclaimer, the term of this patent is extended or adjusted under 35 U.S.C. 154(b) by 45 days.

(21) Appl. No.: 10/449,206

(22) Filed: May 30, 2003

(65) Prior Publication Data

US 2003/0230149 A1 Dec. 18, 2003

(30) Foreign Application Priority Data

| Jun. 13, 2002 | (DE) | 102 26 436.8 |
| Jul. 4, 2002 | (DE) | 102 30 215.4 |
| Jul. 15, 2002 | (DE) | 102 32 101.9 |

(51) Int. Cl.[7] ............................................. G01F 1/66
(52) U.S. Cl. ................................................ 73/861.27
(58) Field of Search .................... 73/861.18, 861.27, 73/861.28, 861.29, 861.31

(56) References Cited

U.S. PATENT DOCUMENTS

| 4,787,252 A | | 11/1988 | Jacobson et al. | |
| 4,838,127 A | * | 6/1989 | Herremans et al. | 73/861.28 |
| 5,052,230 A | * | 10/1991 | Lang et al. | 73/861.28 |
| 5,371,686 A | * | 12/1994 | Nabity et al. | 73/861.25 |
| 5,493,916 A | | 2/1996 | Bignell | |
| 5,777,892 A | * | 7/1998 | Nabity et al. | 73/861.28 |
| 6,546,810 B1 | | 4/2003 | Beauducel et al. | |

FOREIGN PATENT DOCUMENTS

| DE | 33 31 519 A1 | 3/1985 |
| DE | 3438976 A1 | 5/1985 |
| DE | 199 34 212 A1 | 2/2000 |
| EP | 0 312 224 A1 | 4/1989 |
| EP | 1 113 247 A1 | 7/2001 |

* cited by examiner

*Primary Examiner*—Harshad Patel
(74) *Attorney, Agent, or Firm*—Cesari and McKenna, LLP

(57) ABSTRACT

An ultrasonic flow-measuring method measures the flow rate of a medium traveling through a measuring conduit by means of two ultrasound transducers which in the flow direction of the medium are offset relative to each other and both of which alternate in emitting ultrasonic pulses while the respective other ultrasound transducer receives the emitted ultrasonic pulses and the flow rate is determined as a function of the run times of the ultrasonic pulses received by the respective other ultrasound transducer. At least one correction parameter is established on the basis of the calculated sound propagation of the ultrasonic pulses traveling from one ultrasound transducer to the other, the calculation of the sound propagation of those pulses is made by taking into account a predefined frequency spectrum of the oscillations of the ultrasound transducers and the flow rate is calculated by applying the correction parameter established.

8 Claims, 5 Drawing Sheets

US 6,923,073 B2

ULTRASONIC FLOW-MEASURING METHOD

BACKGROUND OF THE INVENTION

This invention relates to an ultrasonic flow-measuring method serving to measure the flow rate of a medium traveling through a measuring conduit, by means of two ultrasound transducers which in the flow direction of the medium are offset relative to each other and both of which alternate in emitting ultrasonic pulses, while the respective other ultrasound transducer receives the emitted ultrasonic pulses and the flow rate is determined as a function of the run times of the ultrasonic pulses received by the respective other ultrasound transducer.

As stated above, the ultrasonic flow-measuring method serves to measure the flow rate of the medium traveling through the measuring conduit. In that context the following should be noted: the medium traveling through the measuring conduit typically has a particular flow pattern. For example, if the flow is laminar, that may be a pattern in which the radial gradient of the speed progression is linear. In fact, at different points within the cross section of the measuring conduit the medium usually travels at different speeds, meaning that the flow rate measured will in all cases be a rate that is averaged along the measuring path, i.e. the connecting line between the two ultrasound transducers.

Moreover, this averaged flow rate does not necessarily represent the mean flow rate of the entire medium within the measuring conduit, but depends on the vector of the measuring path through the medium. The mean value of the flow rate of the entire medium traveling through the measuring conduit can be determined by a measurement employing two ultrasound transducers for as long as the measuring conduit is a rotationally symmetric pipe, the flow pattern as well is rotationally symmetric and the connecting line between the two ultrasound transducers intersects the longitudinal axis of the measuring conduit.

With regard to the measuring conduit it should be noted that typically it is in fact rotationally symmetrical, meaning that is has a circular cross section. In theory, however, the measuring conduit may have any cross-sectional form. In addition, the measuring conduit may be a closed tube or it may be an open trough.

The fundamental measuring principle employed in the above-described ultrasonic flow-measuring method is based on the fact that, in the direction of the flow, the ultrasound pulses travel through the moving medium with one speed component, and in the opposite direction, they travel with another speed or rate component, so that the resulting run times of these ultrasonic pulses will be as follows:

$$T_{ab} = \frac{L}{c + v_m \cos\theta} \quad (1)$$

$$T_{ba} = \frac{L}{c - v_m \cos\theta}, \quad (2)$$

where $T_{ab}$ is the run time of an ultrasonic pulse with a rate component in the flow direction, $T_{ba}$ is the run time of an ultrasonic pulse with a rate component in the opposite direction of the flow, L is the distance between the two ultrasound transducers, c is the acoustic velocity in the medium flowing through the measuring conduit, $v_m$ is the average flow rate of the medium along the measuring path i.e. the connecting line between the ultrasound transducers, and θ is the angle between the connecting line of the two ultrasound transducers and the direction of flow.

Using the equations 1 and 2, the average flow rate of the medium can be calculated as follows:

$$v_m = \frac{L}{2\cdot\cos\theta}\left[\frac{T_{ba} - T_{ab}}{T_{ba}\cdot T_{ab}}\right]. \quad (3)$$

It is evident from equation 3 that the acoustic velocity in the medium does not constitute a function in calculating the flow rate of the medium, meaning that according to this calculation, the flow rate of the medium is unrelated to the acoustic velocity in the medium.

SUMMARY OF THE INVENTION

With regard to the ultrasonic flow-measuring method referred to above, it is the objective of this invention to present an ultrasonic flow-measuring method along that concept offering improved measuring accuracy.

This objective is achieved in that, on the basis of the calculated sound propagation of the ultrasonic pulses traveling from one ultrasound transducer to the other, at least one correction parameter is established, the calculation of the sound propagation of the ultrasonic pulses traveling from one ultrasound transducer to the other is made by taking into account a predefined frequency spectrum of the oscillations of the ultrasound transducers, and the flow rate is calculated by taking into account the correction parameter determined.

It follows that the calculation of the sound propagation of the ultrasonic pulses traveling from one ultrasound transducer to the other takes into account such system parameters as the frequency-dependent attenuation of the ultrasonic pulses in the medium and/or the acoustic velocity in the medium. This applies to a predefined frequency spectrum, meaning that the correction parameter is determined, on the basis of at least one system parameter, not for one single frequency only but for multiple frequencies. The frequency spectrum in question may be a continuous frequency spectrum with contiguous, successive frequencies, or a discrete frequency spectrum composed of discrete, noncontiguous frequencies.

In lieu of or in addition to the aforementioned system parameters, i.e. the frequency-dependent attenuation of the ultrasonic pulses in the medium and the acoustic velocity in the medium, other system parameters may be included in the calculation, such as the diameter or surface area of the oscillating part of the ultrasound transducers, the density of the medium, and the distance between the ultrasound transducers and thus the length of the measuring path. The term oscillating part of an ultrasound transducer refers to that section of the transducer which, because of its ability to oscillate, is responsible for transmitting and receiving the ultrasonic pulses. The size and shape of the oscillating part of the ultrasound transducer is also a key factor in the characteristics of the ultrasonic pulses generated.

A suitable correction parameter may, for instance, be the expected run time of the ultrasonic pulses traveling from one ultrasound transducer to the other, or a particular delay of that run time. The correction parameter is preferably established with the flow rate assumed to be zero. Thus, if the run time is used as the correction parameter, the actual run time measured after the correction will permit the direct determination of the flow rate of the medium. Other, additional correction factors may also be employed.

For rapid access to the values for the correction parameters, preferably in real time, it is possible for determining the correction parameters to store the system parameters in a matrix. One correction parameter may be assigned or mapped to two or more system parameters. Since this will access discrete system parameters only, a preferred implementation of the invention provides for the ability to access intermediate system-parameter values by way of preferably linear interpolation. Alternatively, the correction parameter may be determined via a fit-curve established as a function of the system parameters perhaps in the form of an exact analytical and/or empirical formula. That will provide a continuous system for determining the correction parameter.

BRIEF DESCRIPTION OF THE DRAWINGS

There are a great many ways in which the ultrasonic flow-measuring method according to the invention can be implemented and further enhanced, in which connection reference is made to the dependent claims, to the following description of a preferred invention embodiment, and to the attached drawings, in which:

DETAILED DESCRIPTION OF AN ILLUSTRATIVE EMBODIMENT

Figure 1:
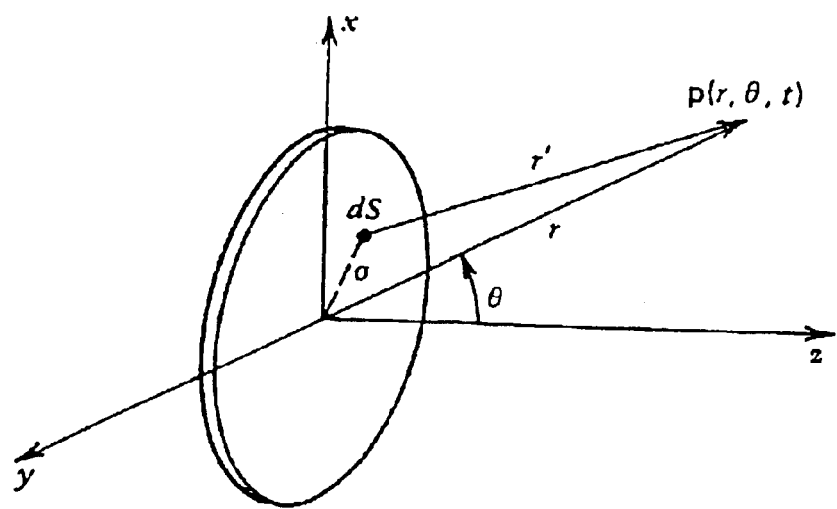
FIG. 1 is a schematic illustration of the coordinate system used for calculating the acoustic pressure field of an ultrasonic pulse.

In FIG. 1, the oscillating part of an ultrasound transducer emitting ultrasonic pulses is schematically illustrated as a flat disc. The local pressure p of the acoustic pressure field generated by the ultrasound transducer in the medium can be determined as a function of the distance r from the center of the disc, and of the angle θ, so that the following applies for determining the progression in time of the acoustic pressure field (Kinsler, Frey, Coppens, Sanders, Fundamentals of Acoustics, Third Edition, Wiley, p.176):

$$p(r, \theta, t) = i \frac{\rho c U_o k}{2\pi} \int\int_S \frac{e^{i(\omega t - kr')}}{r'} dS \qquad (4)$$

where t is the time, ρ is the density of the medium, $U_o$ is the oscillation amplitude of the oscillating part of the ultrasound transducer, k is the wave number, ω is the pulsatance of the oscillations of the ultrasound transducer and S is the surface area of the oscillating part of the ultrasound transducer.

The oscillating part of the ultrasound transducer moves back and forth in the beam direction along a specific rate function u(t). That rate function is characteristic for each type of ultrasound transducer. Based on the knowledge that the movement of the oscillating part of the ultrasound transducer employed is not a harmonic but an oscillation with a broad frequency spectrum, the following can be applied for determining the rate function:

$$u(t) = \sum_n F_n e^{in\omega t}, \qquad (5)$$

where $F_n$ represents the amplitudes at the respective frequency.

The rate function u(t) can now be subjected to a Fourier transform, yielding the components $P_n(r,\theta,f_n)$ of the acoustic pressure field in the frequency range for each Fourier coefficient n. For these components it is then possible for calculating the acoustic pressure field to apply the system parameters in essentially conventional fashion. By way of example, the following does this for the attenuation coefficient α.

For the attenuation coefficient, the following applies (Kinsler, Frey, Coppens, Sanders, Fundamentals of Acoustics, Third Edition, Wiley, p. 148):

$$\alpha = \frac{\omega^2}{2\rho c^3}\left[\frac{4}{3}\eta\right] \qquad (6)$$

where η is the dynamic viscosity of the medium.

Thus, the result for the component $P_n$ is as follows:

$$P_n(r,\theta,f_n,\alpha_n) = P_n(r,\theta,f_n)\cdot e^{-\alpha_n r}, \qquad (7)$$

Figure 2:
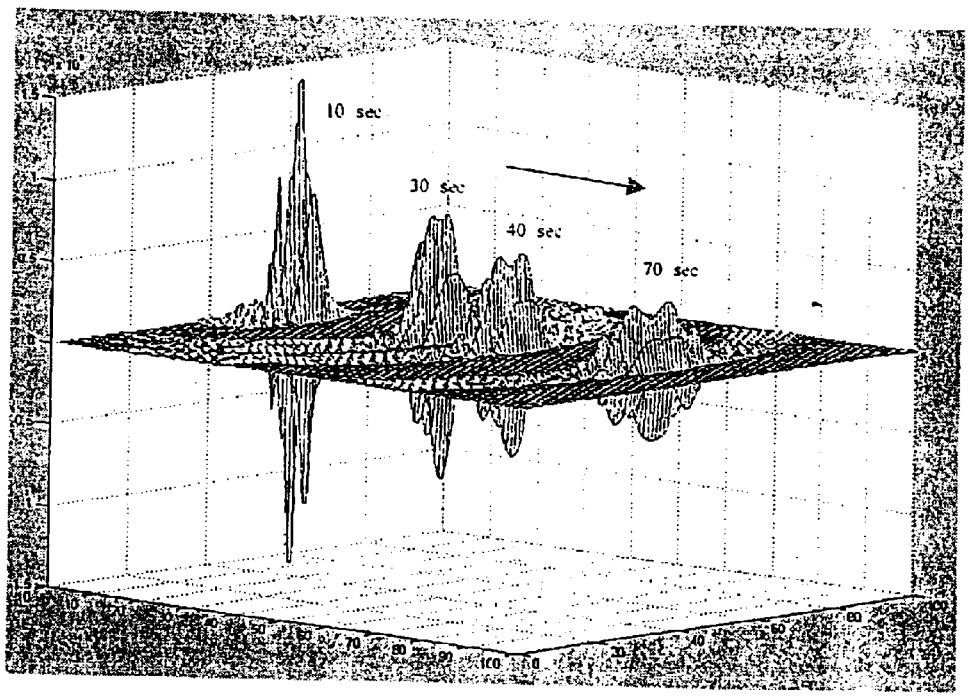
FIG. 2 shows the progression, as a function of time, of an ultrasonic pulse transmitted by an ultrasound transducer through a medium.

After everything necessary has been done for all of the system parameters to be included, an inverse Fourier transform back into the time range is performed which yields the time-related progression of the acoustic pressure field p(r, θ, t, α). FIG. 2 illustrates the acoustic pressure field at four mutually different times, i.e. the progression in time of an ultrasonic pulse transmitted by an ultrasound transducer into the medium.

Figure 3:
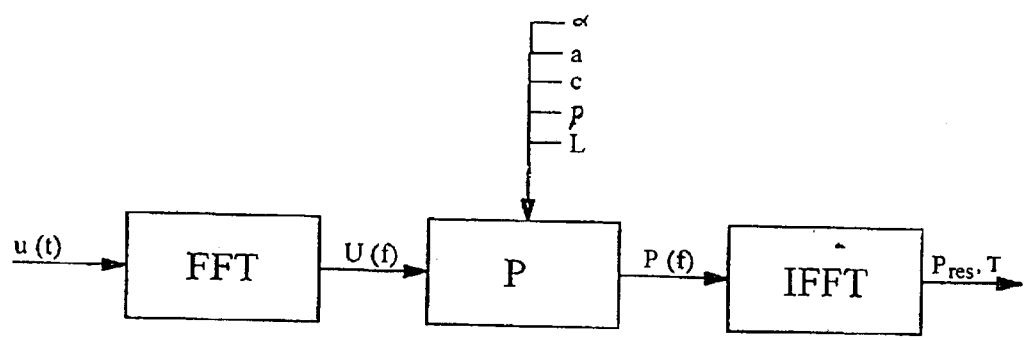
FIG. 3 shows schematically the determination of the correction parameter for the sound propagation, corrected by a Fourier transform for a predefined frequency spectrum of the oscillations of the ultrasound transducers.

FIG. 3 is a schematic illustration of the determination of the correction parameter for the sound propagation by taking into account a predefined frequency spectrum of the oscillations of the ultrasound transducers, applying a Fourier transform as described above. Here it is evident that, apart from making allowances for viscosity via the attenuation coefficient α, other system parameters such as the radius a of the oscillating part of the ultrasound transducers, the acoustic velocity c in the medium, the density ρ of the medium and the length L of the measuring path can be included in the equation in due consideration of the distance between the two ultrasound transducers. Those skilled in the art are quite familiar with the corresponding correlations between the correction parameters and the system parameters as well as the interdependency of the system parameters, discussed in the appropriate technical literature including the aforementioned textbook "Kinsler, Frey, Coppens, Sanders, Fundamentals of Acoustics, Third Edition, Wiley". This then allows for the determination of the resulting acoustic pressure field $p_{res}$ and, ultimately, of the run time T of the ultrasonic pulses from one ultrasound transducer to the other.

A change in the resulting acoustic pressure field $p_{res}$ reflects a change in the run time T of the ultrasonic pulses along the measuring path. For a flow rate of the medium through the measuring conduit theoretically assumed to be zero, the application of a time delay $T_d$ will result in the following run time:

$$T = \frac{L}{c} + T_d \quad (8)$$

The time delay $T_d$ thus introduced is composed of two time elements:

$$T_d = T_{const} + \Delta T \quad (9)$$

where the time element $T_{const}$ is a constant contributor to the time delay and is essentially derived from delays in the electronics of the ultrasonic flowmeter and from delays in the ultrasound transducers. The time element $\Delta T$ represents a variable contribution to the time delay and is largely a function of the acoustic pressure field. As explained further above, the time delay is not constant but is a function of the acoustic velocity c, the length L of the measuring path, the attenuation coefficient α, the radius a of the oscillating part of the ultrasound transducer, etc., so that the following applies to the time delay:

$$T_d = T_d(c, L, \alpha, a, \ldots). \quad (10)$$

Figure 4:
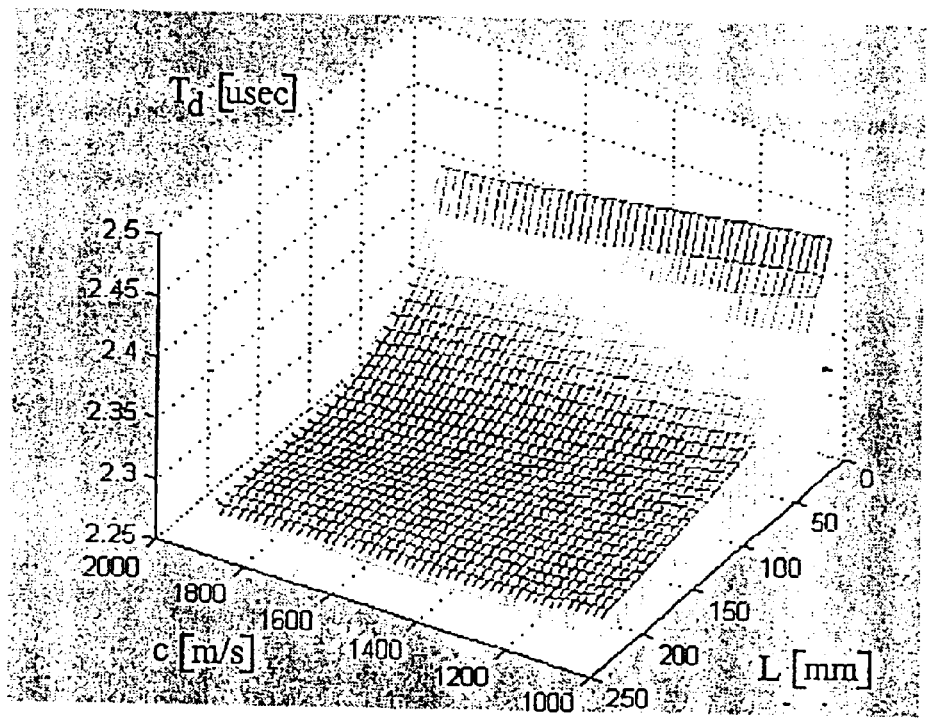
FIG. 4 shows the delay times determined as a function of the acoustic velocity in the medium and of the distance between the ultrasound transducers.

For a given type of ultrasound transducer the radius a is a known factor. If the effect of attenuation and other system parameters, not including the acoustic velocity c and the length L of the measuring path, were to be ignored, the time delay $T_d$ can be calculated as a function of the acoustic velocity c and the length L. The time delays thus determined are represented in the graph of FIG. 4.

Figure 5:
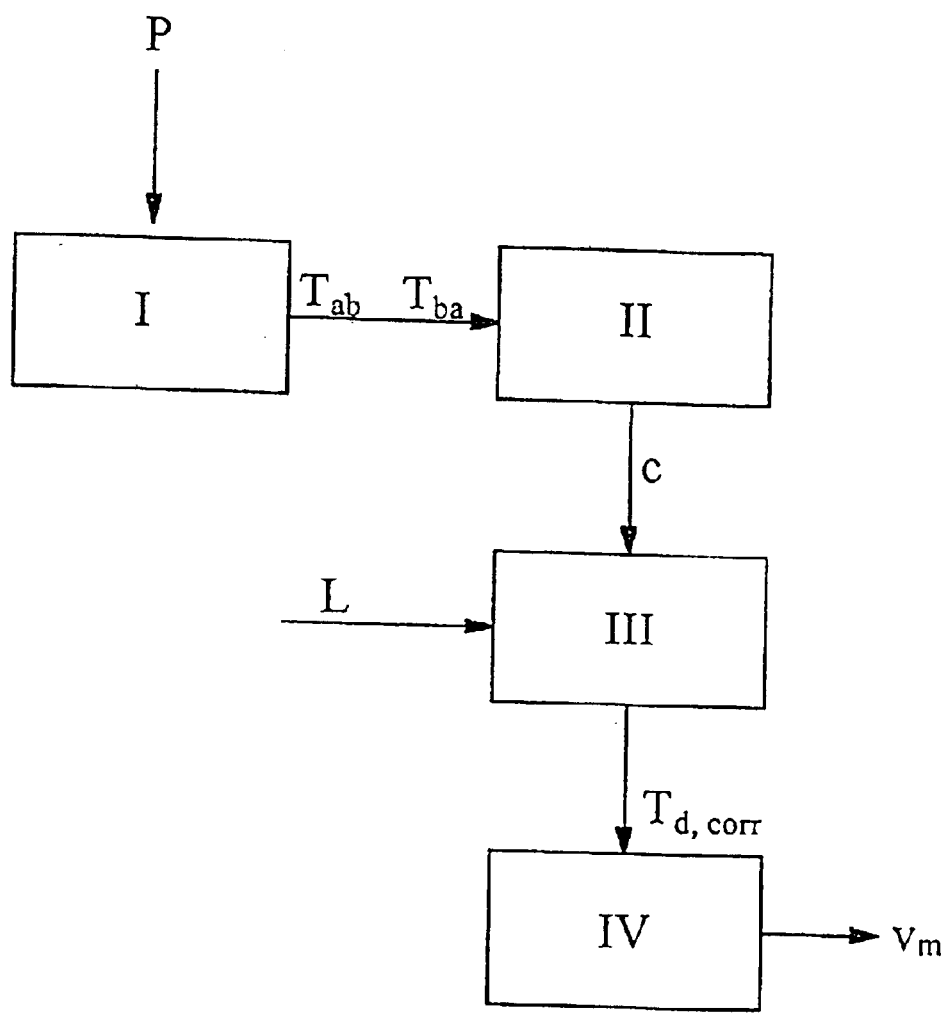
FIG. 5 shows schematically the progression of an ultrasonic flow-measuring method according to a preferred embodiment of the invention.

Based on the concrete values for the time delay $T_d$ as a function of the acoustic velocity c and the length L for a particular type of ultrasound transducer, the following correction procedure, schematically illustrated in FIG. 5, can be performed:

The actually existing acoustic pressure field results in a specific run time T of the ultrasonic pulses from one ultrasound transducer to the other. These run times $T_{ab}$ and $T_{ba}$ in the flow direction and, respectively, the opposite direction are measured in Step I. On the basis of the run times $T_{ab}$ and $T_{ba}$ thus measured, the acoustic velocity c is calculated in Step II by invoking equations 1 and 3.

This calculation is performed in real time during the actual ultrasonic flow-measuring procedure. The result will be as follows:

$$c = \frac{L - T_{ab} v_m \cos\theta}{T_{ab}} \quad (11)$$

Applying the established length L of the ultrasonic flowmeter employed the actual correction can then be made in Step III. This is accomplished in that, in the preferred embodiment of the invention here described, a matrix for the time delay $T_d$ as a function of the length L and of the acoustic velocity c is stored in the ultrasonic flowmeter used for applying the ultrasonic flow-measuring method. Accordingly, one value $T_d$ is assigned to each pair of specific values for L and c, respectively. Intermediate L and c values are established through a linear interpolation between corresponding $T_d$ values. By means of the known length L and the determined acoustic velocity c, it is then possible in Step III to establish a contribution of the time delay on the basis of a length L of the measuring path that deviates from the calibration length $L_{cal}$ typically established in a calibration process at the factory:

$$\Delta T_L = T_d(L_{cal}, c_{cal}) - T_d(L, c_{cal}). \quad (12)$$

Based on the acoustic velocity determined in real time, an analogous procedure may also be applied for an acoustic velocity that deviates from the acoustic velocity applied in the calibration for the medium employed:

$$\Delta T_c = T_d(L, c_{cal}) - T_d(L, c). \quad (13)$$

The corrected time delay $T_{d.corr}$ will then be:

$$T_{d.corr} = T_d - \Delta T_L - \Delta T_c. \quad (14)$$

Applying the corrected time delay $T_{d.corr}$ now permits, in Step IV, the calculation of the flow rate $v_m$, averaged along the measuring path.

For the purpose of this description of the preferred embodiment of the invention, only the time delay $T_d$ has been utilized for the correction. In analogous fashion, the entire run time T, encompassing the time delay $T_d$, can be used. Above and beyond the run time, of course, other parameters as well can be used for the correction.

What is claimed is:

1. An ultrasonic flow-measuring method serving to measure the flow rate of a medium traveling through a measuring conduit, by means of two ultrasound transducers which in the flow direction of the medium are offset relative to each other and both of which alternate in emitting ultrasonic pulses while the respective other ultrasound transducer receives the emitted ultrasonic pulses and the flow rate is determined as a function of the run times of the ultrasonic pulses received by the respective other, ultrasound transducer, wherein, on the basis of the calculated sound propagation of the ultrasonic pulses traveling from one ultrasound transducer to the other, at least one correction parameter is established, the calculation of the sound propagation of the ultrasonic pulses traveling from one ultrasound transducer to the other is made by taking into account a predefined frequency spectrum of the oscillations of the ultrasound transducers, and the flow rate is calculated by applying the correction parameter established.

2. The ultrasonic flow-measuring method as in claim 1, wherein for establishing the correction parameter, the acoustic velocity in the medium, preferably determined in real time, serves as the system parameter applied.

3. The ultrasonic flow-measuring method as in claim 1 or 2, wherein for establishing the correction parameter, the frequency-dependent attenuation of the ultrasonic pulses in the medium serves as the system parameter applied.

4. The ultrasonic flow-measuring method as in claim 1 or 2, wherein for the purpose of establishing the correction parameter, the system parameters are stored in a matrix.

5. The ultrasonic flow-measuring method as in claim 4, wherein the intermediate values of the system parameters are established through interpolation.

6. The ultrasonic flow-measuring method as in claim 1 or 2, wherein for determining the correction parameter, a fit-curve, derived as a function of the system parameters, is employed.

7. The ultrasonic flow-measuring method as in claim 1 or 2, wherein the correction parameter is determined in the presence of a flow rate assumed to be zero.

8. The ultrasonic flow-measuring method as in claim 1 or 2, wherein the correction parameter is determined on the basis of the expected run time of the ultrasonic pulses traveling from one ultrasound transducer to the other or of the delay in the run time of the ultrasonic pulses traveling from one ultrasound transducer to the other.

* * * * *